Patented Sept. 19, 1922.

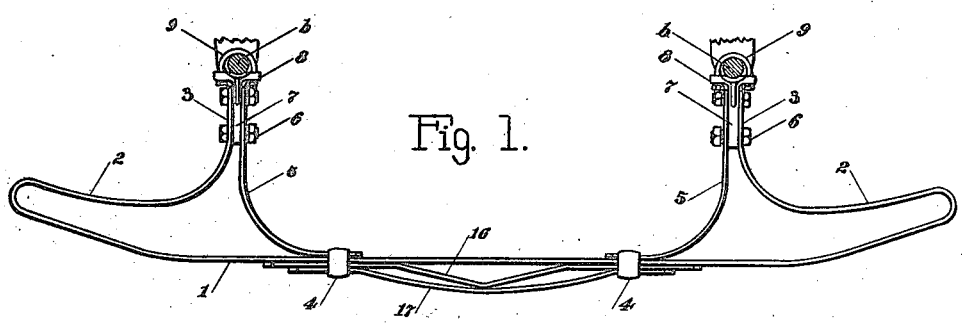
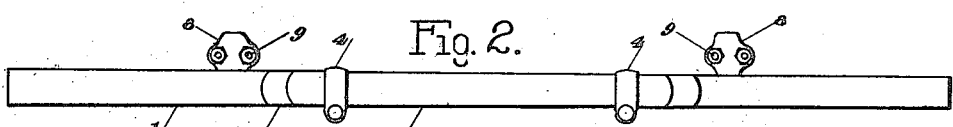
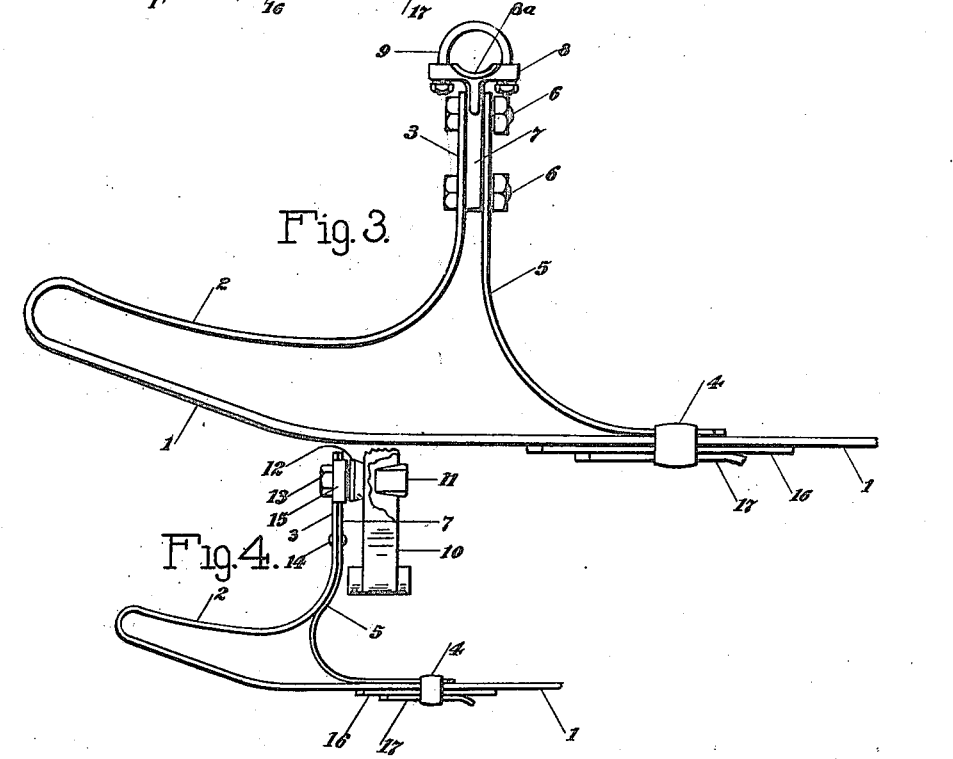
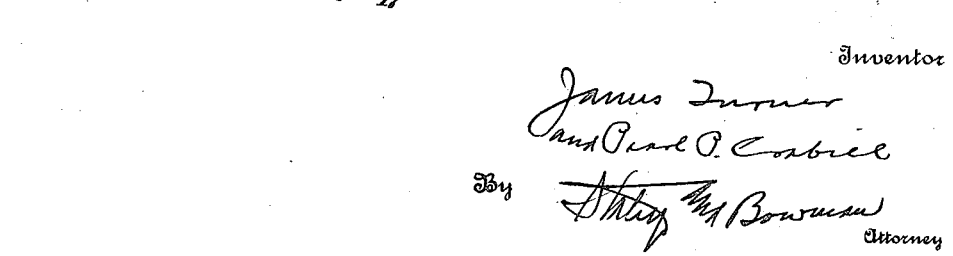

1,429,806

UNITED STATES PATENT OFFICE.

JAMES TURNER AND PEARL P. CRABILL, OF SPRINGFIELD, OHIO.

BUMPER FOR AUTOMOBILES.

Application filed June 6, 1921. Serial No. 475,371.

*To all whom it may concern:*

Be it known that we, JAMES TURNER and PEARL P. CRABILL, citizens of the United States, residing at Springfield, in the county of Clark and State of Ohio, have invented certain new and useful Improvements in Bumpers for Automobiles, of which the following is a specification.

This invention relates to improvements in bumpers for automobiles, it relating more particularly to that type of bumper in which the bumper bar and the supporting arms for same are constructed of spring steel, with the arms integrally formed with the bar.

One of the objects of this invention is to provide for more effectively supporting and bracing the bar from the vehicle frame, and for eliminating vibration in the bar itself. A further object of the invention is to provide a reinforce for the bar of a resilient nature which will aid the bar in resisting shocks.

In the accompanying drawings:—

Fig. 1 is a top plan view of a bumper embodying the improvements.

Fig. 2 is a front elevation of the same.

Fig. 3 is an enlarged top plan view of portion of the same.

Fig. 4 is also a top plan view showing a modification in the manner of attaching the bumper to the vehicle.

Referring to the drawings, 1 represents a bumper bar formed of flat spring steel, the ends of which are bent back in substantial parallelism with the bar proper, as indicated at 2, and thence rearwardly as indicated at 3 to provide attaching arms. Connected to the bar 1 at points suitably removed from the center thereof, by clips 4, are braces 5, also constructed of flat spring steel similar to the material of the bar. Each of these braces is bent on a broad curve with the rear end thereof extending parallel with its companion arm 3, and the forward end lying parallel with the bar 1.

In the construction shown in Figs. 1 to 3, the arm 3 and brace 5 are connected by bolts 5 with the shank 7 of a vertically arranged head 8, the rear side of which is channelled, as indicated at 8ª, to fit the lamp bracket *b* of the vehicle, being clamped thereto by the clip 9; this particular form of connection being one particularly intended for the Franklin car.

When the bumper is to be applied to other cars having channelled frames, other means of securing it in position may be employed, one of which is illustrated in Fig. 4. In this figure, 10 represents the forward portion of one of the channelled side members of the vehicle partly broken away to show a clamping member 11 arranged to be clamped to the lower flange of the frame by a wedge 12, the wedge portion of which is arranged between the lower side of the frame flange and an inclined face on the clamp 11, a bolt 13 being employed to draw the parts together. The arm 3 and rear portion of the brace 5 are preferably connected by a rivet 14 and are received in a channelled plate 15 arranged between the nut of the bolt and the wedge 12. This form of connection is more fully described in our pending application Ser. No. 442,242 filed February 3, 1921.

In order to reinforce the bumper bar proper 1, there is secured to the forward side thereof by the clips 4 a pair of strips, preferably of spring steel, represented by 16 and 17. The ends of these strips are arranged in planes parallel with the bar 1 so as to be clamped thereto by the clips, but the intermediate portion of the outer strip 17 is bowed on the arc of a circle, while the inner strip 16 has its central portion bent in a V-form with the apex thereof in contact with the strip 17 so as to provide a reinforce therefor in the form of a truss; the bent portion of the strip 16 being of lesser length than that of the one 17.

By the construction described, it will be seen that the bumper bar proper 1 is not only firmly secured to and braced from the vehicle frame, but also has a substantial reinforce in its forward side, these devices aiding the bar in a material manner in resisting the shock of collision and materially reducing the danger of breakage to the bumper itself.

While we have shown the braces 5 connected to the bar 1 by the clips 4, yet an equally good form of connection can be had by rivetting the outer ends of the braces to the bar.

Having thus described our invention, we claim:—

1. In a bumper for automobiles, a bar, together with means for attaching the same to the vehicle, and a pair of flat resilient strips having their respective ends arranged parallel to said bar and to each other together with means for connecting the same to said bar, the outer strip being bent forwardly from said bar and a lesser length of the inner strip being also bent forwardly from said bar in contact with the inner side of said forward strip.

2. In a bumper for automobiles, a bumper bar, together with means for connecting the same to the vehicle, and a pair of reinforcing strips connected to the forward side of said bar, one of said strips having its central portion bowed forwardly and the other of said strips being arranged between said bowed strip and the bar and having its central portion bent to a substantial V-shape with the apex thereof in contact with the body portion of the other strip.

3. In a bumper for automobiles, a bar formed of flat resilient material having its rear end bent to form supporting arms to attach the same to the vehicle, a pair of flat resilient strips having their respective ends arranged parallel to said bar and to each other together with means for connecting the same to said bar, the outer strip being bent forwardly from said bar and a lesser length of the inner strip being also bent forwardly from said bar in contact with the inner side of said forward strip.

4. In a bumper for automobiles, a bar having its ends bent to form resilient attaching arms, resilient braces for said bar, each brace being bent so that its forward end will lie parallel with the bar and its rear end parallel with its companion arm, means for connecting the braces to the bar and also for connecting the braces and arms to the vehicle, two reinforcing strips on the forward side of said bar having their respective ends connected therewith, the outer reinforcing strip being bowed forwardly, and the inner reinforcing strip being bent forwardly on a lesser length than the bowed portion of the outer strip so that its central portion will lie in proximity to the central portion of the bow of the outer strip.

5. In a bumper for automobiles, a continuous main bar, resilient means for supporting the same from the vehicle, and an auxiliary resilient bar of bow form arranged on the forward side of said main bar with its ends secured thereto so as to be spaced away from said main bar and arranged to yield toward the same under shock at all points between its connected ends.

6. In a bumper for automobiles, a bar formed of resilient material, integrally formed supporting arms projecting from the ends of said bar in a general rearward direction, a pair of braces of resilient material, each of said braces having its forward end arranged parallel to and connected with the rear side of said bar and its rear end arranged parallel to and connected with its companion supporting arm, and a reinforcing strip for the forward side of said bar, said reinforcing strip being bowed away from said bar with its ends secured thereto and overlapping said braces.

In testimony whereof we have hereunto set our hands this 23rd day of May, 1921.

JAMES TURNER.
PEARL P. CRABILL.

Witness:
CHAS. I. WELCH.